United States Patent Office 3,097,882
Patented July 16, 1963

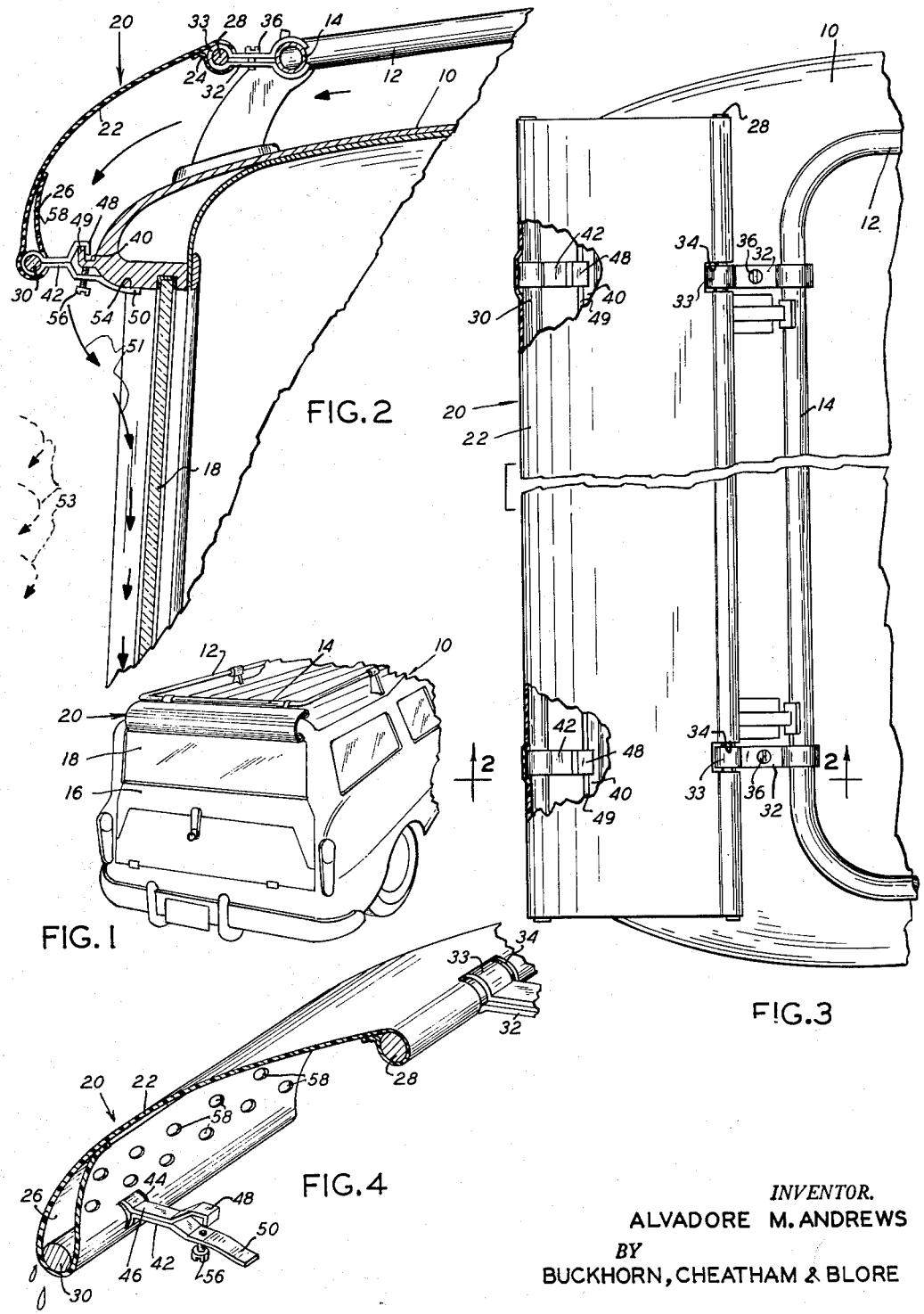

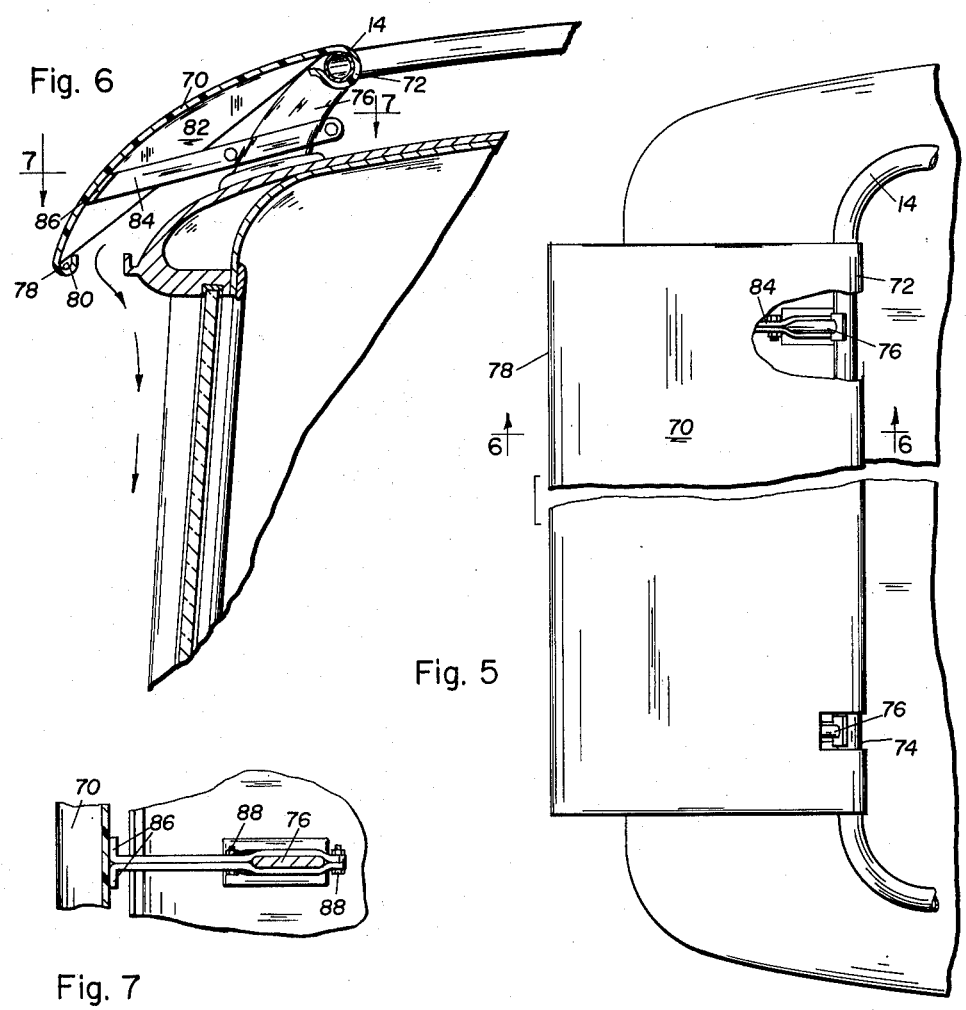

3,097,882
REAR WINDOW DEFLECTOR FOR AUTOMOBILES
Alvadore M. Andrews, 4621 SW. Beaverton-Hillsdale
Highway, Portland, Oreg.
Filed Apr. 10, 1961, Ser. No. 103,678
8 Claims. (Cl. 296—91)

The present invention relates to automotive vehicles and more particularly to means for preventing the depositing of foreign matter on the rear surface of a vehicle while it is in motion.

As is well known, when a vehicle moves forwardly a partial vacuum is formed immediately behind the vehicle which causes foreign matter such as dust or mud or snow thrown up by the vehicle to be drawn inwardly toward the rear of the vehicle so as to impinge thereon. This is particularly troublesome in vehicles such as trucks and station wagons and like square ended vehicles since the impinged material obscures the vision through the rear windows of the vehicle, and in any event is annoying because it necessitates more frequent cleaning of the vehicle.

It is an object, therefore, of the present invention to provide means which will prevent or minimize the deposition of foreign matter on the rear surface of a vehicle while it is in motion.

Another object is to provide means of the type indicated which can be detachably mounted upon a vehicle.

Still another object is to provide a deflector for deflecting air onto the rear surface of a vehicle as the same is moving and which deflector is provided with means to extract any water from such air.

Other objects and advantages will become more apparent hereinafter.

In accordance with an illustrated embodiment, the invention comprises a deflector element which is mounted on the vehicle adjacent the rear surface thereof so as to project into the air stream along the surface of the vehicle, that is, along the sides or top, as the vehicle is moving and to deflect the air stream in a current across the rear surface of the vehicle and more particularly across the rear window thereof. This deflected air stream will break the partial vacuum behind the vehicle adjacent the windows so that the particles carried up behind the vehicle will not be caused to impinge upon the rear surface. For a more detailed description of the invention, reference is made to the following drawings wherein:

FIG. 1 is a fragmentary perspective view of an automotive vehicle having a deflector in accordance with the invention mounted thereon;

FIG. 2 is a sectional view through the rear end of a vehicle showing an arrangement for mounting a deflector thereon;

FIG. 3 is a top view of a vehicle having a deflector mounted thereon in accordance with the invention;

FIG. 4 is an enlarged perspective view of the fragmentary portion of a deflector made in accordance with the invention and showing details thereof;

FIG. 5 is a fragmentary top view of a vehicle having a modified deflector mounted thereon;

FIG. 6 is a sectional view taken along line 6—6 of FIG. 5;

FIG. 7 is a fragmentary sectional view taken substantially along line 7—7 of FIG. 6; and FIG. 8 is a fragmentary perspective view showing a detail of the modified deflector.

The invention is shown in connection with a model of a particular type of vehicle 10 currently on the market, a so-called station wagon type having a luggage rack 12 integrally mounted on the top of the vehicle, the rack including a bar 14 which extends transversely of the roof adjacent the rear edge thereof. The illustrated vehicle is typical of those presently available inasmuch as it is constructed with a substantially flat and vertical rear surface 16 having a window 18 therein. As has been mentioned previously, when such a vehicle is in forward motion a partial vacuum is created adjacent the rear surface 16 which causes foreign matter such as mud, dust or snow thrown up by the wheels of the vehicle 10 or by a passing vehicle to be drawn toward the rear surface 16 and to impinge thereon. Much of this matter will ordinarily impinge upon the rear window 18 of the vehicle, obscuring vision therethrough which is undesirable from a safety standpoint.

In accordance with the invention a deflector is provided on the vehicle to deflect air from the stream which is moving rearwardly relative to the body of the vehicle when the vehicle is in motion across the rear window 18 so as to break such partial vacuum and prevent the impingement of foreign particles upon the window. In accordance with the embodiment of FIGS. 1 to 4 a deflector 20 is provided including a sheet of relatively heavy but flexible plastic material 22 which has its opposite edges folded back and secured upon itself to form pockets 24, 26 therein. Disposed in the upper pocket 24 is an upper supporting rod 28 and disposed in the pocket 26 is a lower supporting rod 30. Means are provided to secure the rod 28 to the vehicle with the rod 28 and the corresponding edge 24 of the sheet 22 positioned above the surface of the vehicle roof and slightly forwardly of the rear edge thereof. In the illustrated embodiment, the rod 28 is clamped to the rear bar 14 of the luggage rack by means of a pair of releasable clamps 32 each of which may comprise, as shown, a metal strip 33 bent upon itself about the bar 28 and extending through an opening 34 in the pocket 24. The opposite end portions of the strip 33 are formed to partially surround the luggage rack bar 14 and may be clamped thereto by means of a screw 36 extending through an opening in one portion of the strip 33 and threadedly engaged in the other.

Means are also provided for securing the rod 30 to the body of the vehicle at a position spaced slightly rearwardly of the rear surface 16 thereof and immediately above the window 18. Such a clamp may be of the type shown and which is adapted to engage the rain gutter 40 which extends across the rear end of numerous makes of vehicles of the type illustrated. In the illustrated embodiment, the gutter 40 is engaged by a clamp 42 comprising an elongate strip of metal bent about the rod 30 and extending through an opening 44 in the pocket 26, as best shown in FIG. 4. The strip may be secured to itself by spot welding or a similar means, immediately adjacent the rod 30. One of the end portions of the strip 42 is bent to form a hook 48 which may engage over the upwardly facing lip 49 of the rain gutter 40 while the other end 50 of the strip is formed to extend beneath the ledge 54 formed by the opening for the window 18. A screw 56 is threaded through the end portion 52 so that it may be tightened against the lower surface of the rain gutter 40 to secure the clamp 42 in position. Other suitable clamping means will be obvious to those skilled in the art. Obviously, the deflector could be fixedly, as well as removably secured. The flexibility of the sheet 22 assists in its storage when not in use, though, obviously, it need not be flexible. As indicated by the arrows 51 in FIG. 2, when the vehicle is in motion, the deflector 22 acts as a vane or scoop to intercept the air stream flowing relatively over the top of the vehicle to deflect and propel such air stream downwardly along the rear surface 16 of the vehicle. This will cause the partial vacuum behind the vehicle to be broken so that the foreign matter normally impinging upon the rear of the vehicle will be deflected by the air stream 51 as indicated by the dotted arrows 53.

As will be apparent, if it should be raining, rain drops and moisture swept from the car roof would impinge upon the deflector 22 and be swept with the deflected air against the window 18. Means are preferably provided, therefore, to intercept the water flowing downwardly along the deflector to prevent it being carried off in the deflected air stream. In the illustrated embodiment, the portion of the sheet 22 which defines the pocket 26 adjacent the vehicle is provided with a plurality of apertures 58 as shown in FIG. 3. Moisture impinging upon the inner surface of the deflector of the sheet 22 will pass through such apertures when the vehicle is in motion so as to be collected within the pocket 26 in which the moisture will flow toward the opposite ends and be distributed in the passing air stream without impinging upon the window 18.

Referring now to FIGS. 5 to 8, the deflector of this embodiment comprises a semi rigid, resilient sheet or body 70 which preferably is molded of a synthetic plastic, such as, for example, one of the butyrates. The body 70 is elongate and is provided with an upper or forward longitudinally extending edge defined by a reversely curved portion 72 forming a hook like element which is adapted to be snapped over the bar 14 of the luggage rack and to be supported thereby. Openings 74 are provided in the edge 72 to provide clearance for the luggage rack supports 76. The lower or rearward edge 78 of the body 70 is positioned rearwardly of the vehicle rear surface and below the top of the roof so that, as best shown in FIG. 6, the body 70 is inclined generally rearwardly and downwardly to deflect air in the desired manner. The edge 78 is defined by a reversely curved portion defining a gutter or trough 80 on the inner surface of the body and which gutter is adapted to collect water flowing downwardly along the deflector's inner surface and prevent it from being carried into the air stream deflected by the deflector. Preferably, end walls 82 are molded integrally with or otherwise fixedly secured to the body 70 to strengthen the same, but the lower edge of such walls is preferably above the gutter 80 so that water may flow freely out of such ends. Means are provided to retain the body 70 in position on the vehicle and which means may comprise brackets 84 having flanges 86 suitably secured, as by solvent binding, to the inner surface of the body 70 and which brackets are secured to the luggage, rack supports 76 by suitable fasteners such as bolts 88.

The present application is a continuation-in-part of my prior copending application Serial No. 799,585, filed March 16, 1959, now abandoned.

Having illustrated and described preferred embodiments of the invention, it should be apparent to those skilled in the art that the invention permits of modification in arrangement and detail. I claim as my invention all such modifications as come within the true spirit and scope of the appended claims.

1. In combination an automotive vehicle including a body having a roof with a luggage rack mounted thereon including a bar extending transversely of said roof adjacent the rear edge thereof, said body including a rear surface having a window therein, and means for preventing the impingement of foreign matter upon said window when the vehicle is in forward motion, said means comprising a sheet of flexible plastic material, a pair of the opposite edges of said sheet being folded back upon said sheet and secured thereto to form pockets along said opposite edges, a first rod disposed in one of said pockets and a second rod disposed in the other of said pockets, first releasable clamp means securing said first rod to said bar with said first rod and the corresponding edge of said sheet positioned above the surface of said roof and slightly forwardly of the rear edge thereof, second releasable clamp means securing said second rod to said body at a position spaced rearwardly of said rear surface and immediately above said window so that said sheet will intercept the air stream along the top of said body and deflect it downwardly across said window, the portion of said sheet adjacent said vehicle and defining said other pocket having a plurality of apertures therein through which moisture collecting on the surface of said sheet may flow to said other pocket.

2. In combination an automotive vehicle including a body having a roof and a rear surface having a window therein, and means for preventing the impingement of foreign matter upon said window when the vehicle is in forward motion, said means comprising a sheet of flexible material, a pair of the opposite edges of said sheet being folded back upon said sheet and secured thereto to form pockets along said opposite edges, a first rod disposed in one of said pockets and a second rod disposed in the other of said pockets, releasable means for clamping said first rod to said vehicle with said first rod and the corresponding edge of said sheet positioned above the surface of said roof and slightly forwardly of the rear edge thereof, second releasable clamp means securing said second rod to said body at a position spaced rearwardly of said rear surface and immediately above said window so that said sheet will intercept the air stream along the top of said body and deflect it downwardly across said window, the portion of said sheet adjacent said vehicle and defining said other pocket having a plurality of apertures therein through which moisture collecting on the surface of said sheet may flow to said other pocket.

3. A deflector element for attachment to an automotive vehicle including a body having a roof with a luggage rack mounted thereon including a bar extending transversely of said roof adjacent the rear edge thereof, said element comprising a sheet of flexible material, a pair of the opposite edges of said sheet being folded back upon said sheet and secured thereto to form pockets along said opposite edges, a first rod disposed in one of said pockets and a second rod disposed in the other of said pockets, first releasable clamp means for securing said first rod to said bar with said first rod and the corresponding edge of said sheet positioned above the surface of said roof and slightly forwardly of the rear edge thereof, second releasable clamp means for securing said second rod to said body at a position spaced rearwardly of said rear surface and below the elevation of said first rod so that said sheet will intercept the air stream along the top of said body and deflect it downwardly across said rear surface, the portion of said sheet defining said other pocket having a plurality of apertures therein through which moisture collecting on the surface of said sheet may flow to said other pocket.

4. A deflector element for attachment to an automotive vehicle including a body having a roof so as to deflect air across the rear surface of said vehicle and prevent the impingement of foreign matter thereupon when the vehicle is in forward motion, said element comprising a sheet of flexible material, a pair of the opposite edges of said sheet being folded back upon said sheet and secured thereto to form pockets along said opposite edges, a first rod disposed in one of said pockets and a second rod disposed in the other of said pockets, clamp means for securing said first rod to said vehicle with said first rod and the corresponding edge of said sheet positioned above the surface of said roof and slightly forwardly of the rear edge thereof, clamp means for securing said second rod to said body at a position spaced rearwardly of said rear surface and immediately above said rear surface so that said sheet will intercept the air stream along the top of said body and deflect it downwardly across said rear surface, the portion of said sheet defining said other pocket having a plurality of apertures therein through which moisture collecting on the surface of said sheet may flow to said other pocket.

5. In combination an automotive vehicle including a body having a rear surface and a roof with a luggage rack mounted thereon including a bar extending transversely of said roof adjacent the rear edge thereof and spaced supports supporting said bar from said roof, and a device for deflecting air when the vehicle is in forward motion across the said rear surface, said device comprising a sheet of molded resilient plastic or like material, said sheet having a forward edge comprising a reversely curved portion extending around said bar, said sheet having a rear edge positioned rearwardly of said rear surface and below the level of said roof, said rear edge comprising a reversely curved portion defining a gutter on the surface of said sheet facing said vehicle, said gutter extending the length of said sheet and being open at its opposite ends so that water flowing from the surface of said sheet into said gutter may escape from said opposite ends, and bracket means on said sheet releasably engaging said luggage rack supports to maintain said device in position.

6. In combination an automotive vehicle including a body having a rear surface a roof with a luggage rack mounted thereon including a bar extending transversely of said roof adjacent the rear edge thereof and spaced supports supporting said bar from said roof and a device for deflecting air when the vehicle is in forward motion across the said rear surface, said device comprising a sheet-like body having a forward edge comprising a reversely curved portion extending around said bar, said body having a rear edge positioned rearwardly of said rear surface and below the level of said roof, said rear edge comprising a reversely curved portion defining a gutter on the surface of said body facing said vehicle, said gutter extending the length of said body and being open at its opposite ends so that water flowing from the surface of said body into said gutter may escape from said opposite ends, and bracket means on said body engaging said luggage rack supports to maintain said device in position.

7. A device for attachment to an automotive vehicle having a roof with a luggage rack mounted thereon including a bar extending transversely of the roof adjacent the rear edge thereof so as to deflect air across the rear surface of said vehicle when the vehicle is in forward motion, said device comprising an elongate body of semi-rigid molded plastic or like material, said body being reversely curved along one edge thereof to provide a hook like element for receiving said bar, means fixed to said body for securing said body in rigid position on said vehicle with the opposite edge of said body spaced rearwardly of rear surface and slightly below the level of said roof so as to interrupt the air stream along the top of said body and deflect it downwardly across said rear surface, said opposite edge being reversely curved in the direction facing toward said vehicle when said device is mounted thereon to provide a gutter for collecting water flowing along the corresponding surface of said body.

8. A device for attachment to an automotive vehicle having a roof with a luggage rack mounted thereon including a bar extending transversely of the roof adjacent the rear edge thereof so as to deflect air across the rear surface of said vehicle when the vehicle is in forward motion, said device comprising an elongate body, said body being reversely curved along one edge thereof to provide a hook like element for receiving said bar, means fixed to said body for securing said body in rigid position on said vehicle with the opposite edge of said body spaced rearwardly of rear surface and slightly below the level of said roof so as to interrupt the air stream along the top of said body and deflect it downwardly across said rear surface, said opposite edge being reversely curved in the direction facing toward said vehicle when said device is mounted thereon to provide a gutter for collecting water flowing along the corresponding surface of said body.

References Cited in the file of this patent

UNITED STATES PATENTS

| | | |
|---|---|---|
| D. 175,324 | Sullivan | Aug. 9, 1955 |
| 1,394,084 | Gross | Oct. 18, 1921 |
| 1,981,897 | Bishop | Nov. 27, 1934 |
| 2,444,201 | Deschamps | Jan. 29, 1948 |
| 2,638,376 | Berry | May 12, 1953 |
| 2,919,952 | Riddle et al. | Jan. 5, 1960 |